Figure 5:
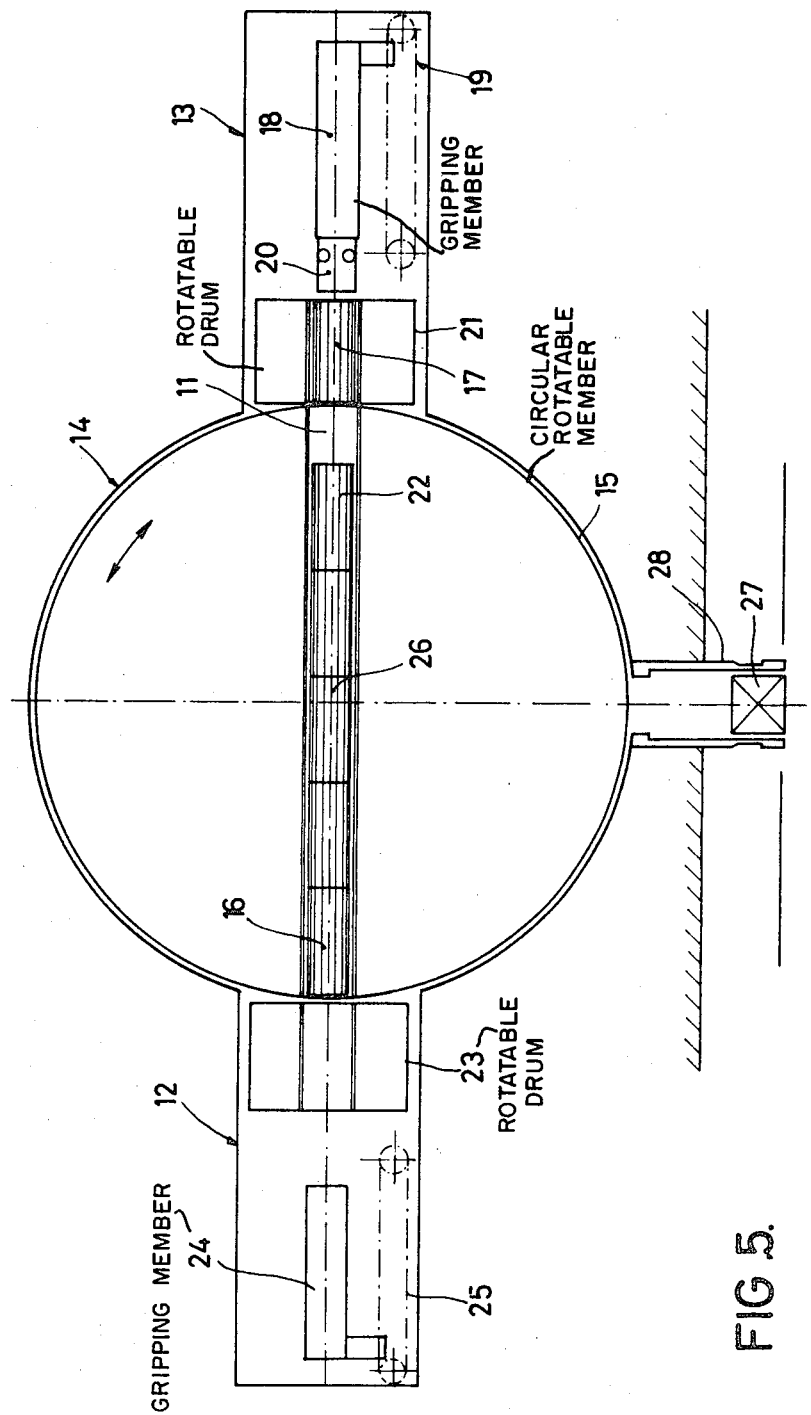

United States Patent
Buzzi et al.

[15] 3,677,328
[45] July 18, 1972

[54] APPARATUS FOR CHARGING AND DISCHARGING FUEL ELEMENTS IN A VERTICAL-CHANNEL NUCLEAR REACTOR

[72] Inventors: Umberto Buzzi, Laveno; Jacques Pierre Dufresne, Varese; Flaviano Farfaletti-Casali, Milan, all of Italy

[73] Assignee: European Atomic Energy Community (Euratom), European Center Kirchberg, Luxembourg

[22] Filed: Jan. 28, 1970

[21] Appl. No.: 6,532

[30] Foreign Application Priority Data

Feb. 5, 1969    Italy..................................34745 A/69

[52] U.S. Cl..................................165/47, 176/30, 214/18 N
[51] Int. Cl.........................................................G21c 19/20
[58] Field of Search........................176/30, 31, 32; 214/18 N

[56] References Cited

UNITED STATES PATENTS 3,206,367   9/1965   Peuchmaur et al......................176/30

FOREIGN PATENTS OR APPLICATIONS 914,922   1/1963   Great Britain........................214/18 N
1,492,895   7/1967   France.....................................176/30

Primary Examiner—Frederick L. Matteson
Assistant Examiner—W. C. Anderson
Attorney—Stevens, Davis, Miller & Mosher

[57] ABSTRACT

Apparatus for use in manipulation of fuel elements for a vertical channel nuclear reactor comprises a receptacle for a column of elements which is vertical for charging and discharging of the reactor but is turned into a horizontal position for replacement of one or more of the elements.

7 Claims, 6 Drawing Figures

PATENTED JUL 18 1972  3,677,328
SHEET 1 OF 3
FIG.1.
FIG.3.
FIG.2.
FIG.4.
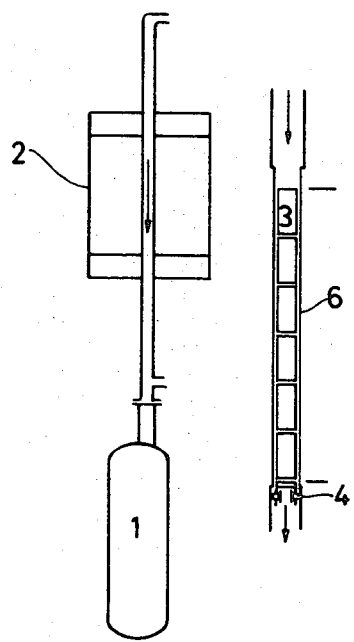
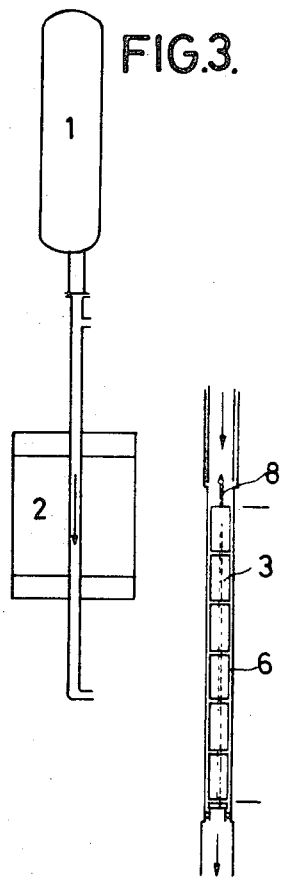
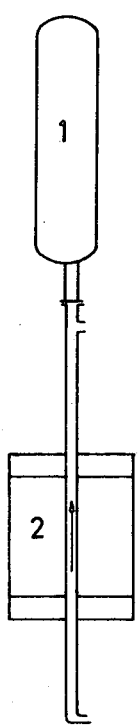
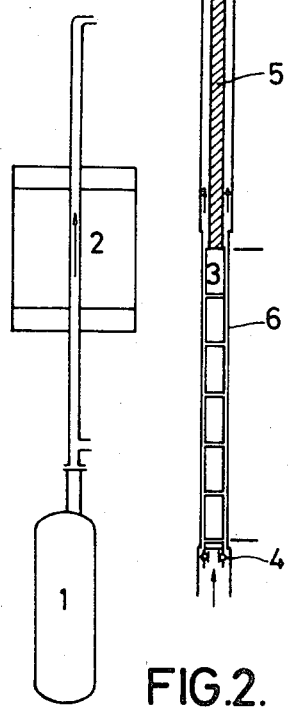
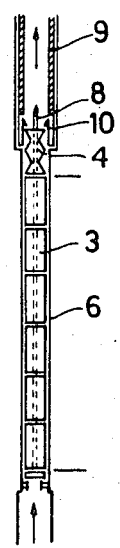

APPARATUS FOR CHARGING AND DISCHARGING FUEL ELEMENTS IN A VERTICAL-CHANNEL NUCLEAR REACTOR

The invention relates to the construction of apparatus for horizontally manipulating fuel elements which have been withdrawn from or are to be inserted into a vertical-channel reactor.

The removal of spent fuel elements and the insertion of new fuel elements into a vertical-channel reactor raises special difficulties because of the vertical arrangement of the channels and the necessity of manipulating the elements in a vertical position.

Apart from the complexity of the actual manipulation, a larger amount of supporting material is needed and the grids for the fuel elements need a more complicated structure as compared with a horizontal-channel reactor, since they need to have suitable engagement surfaces for enabling the various operations to be performed in the vertical position.

The manipulation operations are more simple in a horizontal-channel reactor, where the fuel elements bear horizontally on their lower generatrices inside the pressure tubes, and are disposed side by side. In the last-mentioned reactors, the horizontal channels merely need to be accessible at both ends, and two identical charging and discharging machines are disposed at the two end surfaces of the reactor. It is therefore sufficient to connect the machine operating as a charging machine to the end of the channel into which it is desired to introduce a new fuel element, and to connect the machine operating as a discharging machine to the opposite end of the same channel from which it is desired to withdraw the spend fuel element.

Accordingly, the spent fuel element can be withdrawn from the opposite end of the channel, inside the discharging machine, by pushing the new fuel element inside the channel and horizontally sliding the entire column of elements inside the guide tube.

By reversing the direction of the operation, the spent fuel element on the opposite side to that of the preceding channel can be discharged from an adjacent channel. In this manner, the fuel elements can move step-by-step in one or the other direction in each channel.

In the most well-known system applied to a vertical-channel reactor, a charging machine is used at the upper part of the reactor and the fuel elements bear on one another at the bottom of the channel.

In such cases, unless there is a single fuel element assembly per channel without the possibility of changing the position of the fuel element subassemblies along the axis of the channel, the channel has to be emptied by extracting the fuel elements one at a time by a gripping member operated by the charging and discharging machine, which seizes the elements by their upper grid. The same system is used to replace the fuel elements in the channel, one at a time.

The system has obvious disadvantages, such as the height of the junctions between fuel sub-assemblies, the large quantity of material required to form the grids, the need to introduce the gripping member into the active part of the reactor down to the bottom of the channel, and the time during which the channel remains inoperative because of the charging and discharging operations.

In another known method, a charging and discharging machine is disposed at the lower part of the reactor and, as before, the fuel elements bear on one another on a removable bearing element at the bottom of the channel. In the latter case, the lower bearing member is moved and lowered in the machine until the entire column of fuel elements has been placed in the machine. The operations become complicated, however, if it is desired to add a new element, remove a spent element or change the order of the elements in the charging and discharging machines. In each case, the fuel elements have to be manipulated one at a time and a strong grid is required at the end, having a suitable engagement or operating surface.

Finally, in another method, the vertical channels of the reactor are accessible at both the upper and lower ends to two charging and discharging machines, one disposed at the lower end and the other disposed at the upper end of the reactor.

In the latter case, in addition to the problem of expense and bulk, the fuel elements have to be supported at the bottom of the channel on a support which can be opened but not removed, which is always complicated and unreliable in operation. Furthermore, the height of the junctions and the amount of material in the grids are even greater than in the previous methods, since it must be possible to manipulate the fuel element grids at both ends and, more particularly, the lower grid has to be particularly strong so as to bear on a support which can be opened and which is actuated by the charging and discharging machine.

The aim of the method according to the invention is to facilitate the manipulating operations, using a single charging and discharging machine and therefore operating from a single end of the reactor, either from the lower or the upper end. The invention, in some of its forms also seeks to reduce to a minimum the height and quantity of material in the grids at the ends of the fuel elements of a vertical-channel reactor.

The method is based on the principle of manipulating single elements, removing a spent element and adding a new element, in a horizontal position, after all the vertical elements have been discharged together.

The method makes use of an ordinary charging and discharging machine which charges and discharges all the fuel elements in a channel together. Use is also made of a replacement apparatus which is separate from the charging and discharging machine and which moves the entire column of fuel elements from a vertical to a horizontal position, in which it replaces a spent element by a new element, and then moves the column back to a vertical position ready for re-insertion into the reactor.

FIGS. 1 to 4 of the accompanying drawings illustrate various cases of vertical-channel nuclear reactors in which a single charging and discharging machine is used and to which the proposed method can be applied.

The examples refer to reactors in which the cooling fluid is an organic liquid. In FIG. 1, a charging and discharging machine 1 is disposed below the reactor 2 and there are no hydro-dynamic lifting forces acting on the fuel elements due to the flow of the coolant, i.e., the organic coolant flows downwards. FIG. 2 is similar to FIG. 1, except that the organic coolant flows upwards and tends to lift the fuel elements. FIGS. 3 and 4 show the organic coolant flowing downwards and upwards respectively, a charging and discharging machine being disposed above the reactor. At the side of each of the Figures there is a diagram of a column of fuel elements suitable for each method.

Figure 6:
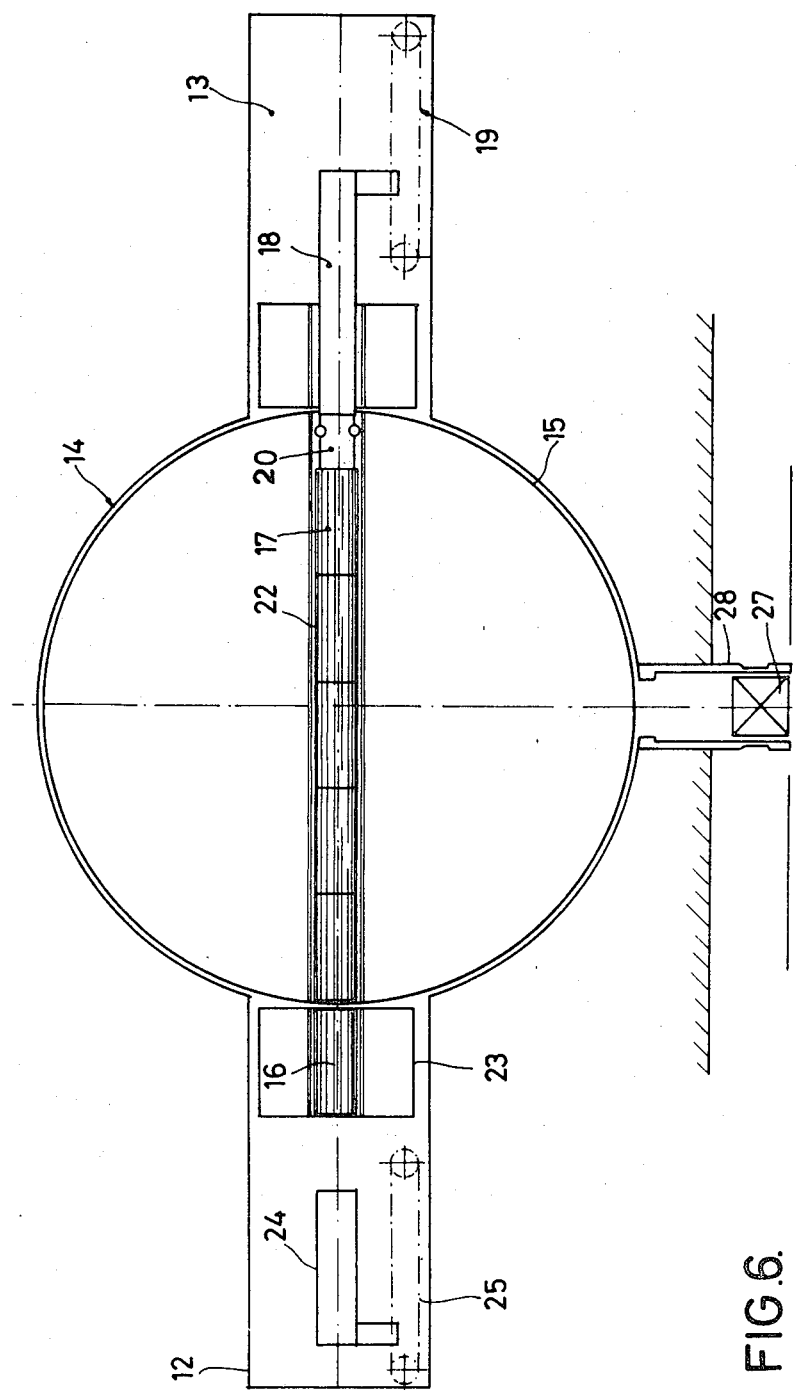

FIGS. 5 and 6 show the subject of the invention, i.e., the replacement apparatus, in the operating position.

In FIG. 1, the charging and discharging machine 1 is shown disposed at the bottom of reactor 2 and the fuel elements tend to move downwards by gravitation. In FIG. 1, the fuel elements 3 merely bear on one another and are supported at the bottom by a support 4 which can be secured to an extension of the channel but can be removed from the charging and discharging machine. In the last-mentioned case, if the charging and discharging machine is connected to the lower end of the channel and the support 4 is removed, the entire column of fuel elements 3 descends by gravity into the machine and the channel is emptied, whereupon the machine inserts another column of elements which has previously been prepared.

As soon as the column of fuel elements has been introduced into the charging and discharging machine, the machine is connected to a replacement apparatus into which the column of elements extracted from the reactor can be introduced.

The replacement apparatus comprises an initially vertical casing having the same internal shape as a reactor channel. The apparatus, like the charging and discharging machine, can contain cooling fluid of the same kind as that which flows in the reactor. The charging and discharging machine pushes the entire column of fuel elements withdrawn from the reactor into the casing or preparation channel, and secures the column there by means of the lower support, in exactly the same manner as it would operate in a reactor channel. After this stage, the charging and discharging machine is free to move back under the reactor and operate on other channels, whereas the operations of manipulating the fuel elements in the column deposited in the replacement apparatus occur in the apparatus alone, after the column has rotated from a vertical to a horizontal position. As soon as the column of fuel elements has been prepared in the replacement apparatus, by removing a spent fuel element and introducing a new fuel element, the charging and discharging machine returns to take the column and re-insert it into the reactor.

In FIG. 2, the charging and discharging machine is likewise disposed at the bottom of the reactor, but as the organic coolant flows upwards, the fuel elements 3, which are aligned relative to one another in known manner and which bear on one another, are held in position and pressed downwards by a cylindrical weight 5 for securing them, the weight being disposed in an upper extension of channel 6 and bearing on the upper end of column 3. The weight can be a hollow or sealing-tight cylinder of zirconium alloy filled with lead. The weight 5 is designed so that it is not subject to the lifting force. When the column of fuel elements is lowered, the weight moves downwards and gradually enters the channel inside the reactor, thus limiting the cross-section available for the organic liquid to flow and pushing the fuel elements downwards. When the column of elements has been completely withdrawn from the channel and is in the lower extension, which is larger in diameter and where there is no lifting effect, the weight 5, which has occupied the entire height of the channel, bears by means of its upper, larger-diameter part 7 on the upper inlet of the channel, and is detached from the column of fuel elements. The column of elements can then be withdrawn from the reactor and inserted in the replacement apparatus as described in connection with FIG. 1.

In FIG. 3, a charging and discharging machine 1 is disposed above the reactor 2 and there is no hydro-dynamic lifting force. The fuel elements in a channel have to be combined into a single cluster which can be manipulated from above. In our method, the fuel elements are threaded on top of one another round a central rod 8 like a spit, which has a gripping and lifting device at its upper end. The fuel elements of course are formed with a central aperture through which the rod 8 can extend.

In FIG. 4, the charging and discharging machine is disposed above the reactor and a lifting force is present, i.e., the organic coolant flows upwards. As in the preceding case, the column of fuel elements is lifted by the central rod 8. In the present case, the securing weight 9 is tubular so that the column of elements can move inside it, and the weight 9 has an openable support 10 at its lower end.

In the cases illustrated in FIGS. 3 and 4, the central rod 8 must be withdrawn from the bottom of the column as soon as the column of elements, in a vertical position, has been introduced into the replacement apparatus. The rod is re-inserted into the column after the spent fuel element has been replaced and the cluster has been re-formed.

The replacement apparatus 14, illustrated in FIGS. 5 and 6, comprises a circular rotatable member 15 embodying a cylindrical casing 11, a device 12 for receiving spent fuel elements and a device 13 for supplying new elements. Devices 12 and 13 are disposed in diametrically opposite positions with respect to member 15 so as to be at the two ends of the casing 11 when the latter is in the horizontal or operating position. Devices 12 and 13 each comprise a drum or turret rotatable about a horizontal axis and comprising several cylindrical cavities or sockets which can be aligned with casing 11 and are designed to hold single fuel elements. The cavities are equally spaced from the axis of rotation of the drum. Devices 12 and 13 also comprise movable pushing or gripping members 18, 24 for horizontally pushing, in one or the other direction, single fuel elements, or an entire column of elements in casing 11, during the various stages of manipulation.

FIGS. 5 and 6 show the replacement of a spent element 16 by a new element 17. As seen in FIG. 5, device 13 contains a gripping member 18 which can be moved by means of a chain 19 and which has removed the support 4 of the column of fuel elements from the casing 11, through the rotating drum 21, which has been rotated to align a new element 17 with the casing 11. If the elements forming a column are coupled, the rotation of drum 21 can be used to align element 17 along the axis of casing 11 in such a manner that it can be coupled to the last element 22 in the column. In the latter case, of course, the column must be moved towards the feed device 13 so as to locate the elements 17 and 22 for coupling. At this stage, the gripping member 18 can push element 17 into channel 11 by means of the column support 4, thus pushing the entire fuel column 26 and ejecting the spent element 16 into the drum 23, as shown in FIG. 6. Drum 23 rotates in the opposite direction to drum 21 so as to detach or uncouple the spent element 16 from column 26. Column 26 and support 4 have thus been arranged with a new element and are ready for re-insertion into the reactor by means of the charging and discharging machine, after the whole column has been brought back to a vertical position. The foregoing description has been concerned with the case in which the rotation of member 15 has inserted the column between devices 12 and 13 with the support 4 on the side of device 13. If the member 15 is rotated 180° from the position shown, the column can be inserted in the opposite direction between devices 12 and 13. In the latter case, support 4 will be on the same side as device 12 for removing spent elements, and it can be withdrawn by the gripping device 24 operated by chain 25, since the devices 12 and 13 are identical. The spent elements can therefore be withdrawn on either side of column 26 and the fuel elements can be moved step-by-step in one or the other direction in each column. In FIGS. 5 and 6, a plug 27 closes one end 28 of a preparation channel. The plug is removed to introduce column 26 into apparatus 14 or to take out the column and insert it in a charging and discharging machine.

The main advantage of using the aforementioned apparatus relates to the structure of the fuel elements. The junctions or couplings between the superposed elements may have a very small height compared with all the other methods, and a minimum amount of material may be used in the grids, since no engagement surface is required at the end of each element.

In cases where the fuel elements form a cluster, thin, flexible grids can be used at the ends, merely in order to maintain the radial position of the bars in the channel, and the axial load can be evenly divided between the different bars or elements of the cluster.

One advantage consists in the reduction of the operations performed by the charging and discharging machine, which merely has to charge or discharge all the elements in a reactor channel at once, without remaining inoperative while a spent element is replaced, since the latter operation is performed in the replacement apparatus.

Another advantage is that a device for gripping the elements does not need to be introduced into the active part of the channel.

A further advantage is that the fuel elements are always in the same relative position to one another during their lifetime inside the reactor. Thus avoiding stresses on the can and plugs, due to adjustments of position.

The cooling of the fuel elements in the replacement apparatus does not present a problem. It is sufficient to ensure that the entire apparatus is disposed in a sealing-tight container or casing having an inlet for introducing fuel elements and having a closing system identical with that in the charging and discharging machine or at the ends of the reactor channels. The container can therefore be filled, in a known manner, with the same cooling fluid as that which flows in the reactor channels. The fluid can be kept moving inside the rotating member by pumping it in the direction corresponding to the axis of rotation.

A number of cylindrical casings can be provided for replacing, at the same time or one after the other, several fuel elements. If the casings are independent of one another, each having their own devices for receiving spent elements and supplying new elements, a number of fuel element columns can be manipulated independently and simultaneously. If a cylindrical rotatable member includes several cylindrical casings, it can be arranged for axial movement in order to align the different fuel element columns one after the other with the devices for receiving spent elements and supplying new elements.

The apparatus described in the present application is not limited to the embodiment illustrated in the accompanying drawings. Numerous structural alterations can be made to it without departing from the spirit of the invention.

We claim:

1. Apparatus for exchanging fuel elements in a vertical channel nuclear reactor, characterized in that the apparatus comprises a member rotatable about a horizontal axis and formed with at least one cylindrical cavity, a device for supplying new fuel elements, and a device for withdrawing spent fuel elements, the devices being disposed in line with a substantially horizontal axis perpendicular to the axis of rotation of the member and in symmetrically opposite positions with respect to the rotating member and an orifice for charging and discharging fuel elements into and from the cavity, the orifice being disposed at the periphery of the apparatus and in an intermediate angular position with respect to the axes of the aforementioned devices.

2. Apparatus as claimed in claim 1, characterized in that the cylindrical cavity extends diametrically through the rotating member and can contain an entire column of fuel elements, and when the rotating member rotates, the cavity can move into a substantially horizontal position in line with the devices for supplying and withdrawing fuel elements.

3. Apparatus as claimed in claim 1, characterized in that the rotating member is cylindrical.

4. Apparatus as claimed in claim 1, characterized in that the cylindrical rotatable member can move along its rotation axis.

5. Apparatus as claimed in claim 1, characterized in that the devices for supplying and withdrawing fuel elements comprise a rotatable drum means, gripping and pushing means which can move longitudinally and a chain for effecting this movement.

6. Apparatus as claimed in claim 5, characterized in that the rotatable drum is formed with a plurality of cylindrical cavities which can contain single fuel elements and are disposed at equal intervals from the axis of rotation of the drum so that, when the drum rotates, each cavity can be brought into line with the substantially horizontal axis of the devices for supplying or withdrawing fuel elements.

7. Apparatus for use in exchanging fuel elements in a vertical channel nuclear reactor and comprising a closed casing with means for circulating a cooling fluid therethrough, a member rotatable within the casing in a vertical plane about a horizontal axis and having an open-ended cylindrical throughway perpendicular to the axis of rotation, two loading and unloading devices in the casing at positions opposite the ends of the throughway when lying horizontally, said devices each comprising a turret with a plurality of open-ended sockets alignable in turn with the throughway by rotation of the turret and a pusher for pushing a fuel element out of the aligned socket into the throughway, said casing also having an opening with a removable closure, at a position aligned with the throughway when the throughway is vertical, for insertion into and removal from the throughway of a vertical column of fuel elements.

* * * * *